(12) United States Patent
Mowris

(10) Patent No.: US 12,352,458 B1
(45) Date of Patent: Jul. 8, 2025

(54) SIMPLE AIRFLOW MEASUREMENT METHOD

(71) Applicant: Robert J. Mowris, Olympic Valley, CA (US)

(72) Inventor: Robert J. Mowris, Olympic Valley, CA (US)

( * ) Notice: Subject to any disclaimer, the term of this patent is extended or adjusted under 35 U.S.C. 154(b) by 0 days.

(21) Appl. No.: 19/006,672

(22) Filed: Dec. 31, 2024

(51) Int. Cl.
F24F 11/89 (2018.01)
F24F 11/46 (2018.01)
G01F 1/688 (2006.01)

(52) U.S. Cl.
CPC .............. *F24F 11/89* (2018.01); *F24F 11/46* (2018.01); *G01F 1/688* (2013.01)

(58) Field of Classification Search
CPC .................................................. G01F 1/68–699
See application file for complete search history.

(56) References Cited

U.S. PATENT DOCUMENTS 7,891,573 B2   2/2011  Finkam et al.
9,605,857 B2 *  3/2017  Secor ..................... F24F 11/523

OTHER PUBLICATIONS

"Air Measurement Techniques", HVAC&R Nation, Jun. 2021, pp. 15-17.*
Fieldpiece, In-Duct Hot Wire Anemometer Operator's Manual Model STA2, 2011, https://resources.fieldpiece.com/wp-content/uploads/2020/12/Opman-STA2v19.pdf.
American Society of Heating, Refrigerating, and Air Conditioning Engineers (ASHRAE), ANSI/ASHRAE, Standard 221-2020 Test Method to Field-Measure and Score the Cooling and Heating Performance of an Installed Unitary HVAC System, Jul. 31, 2020. ASHRAE. Atlanta, GA. USA.

* cited by examiner

*Primary Examiner* — Justin N Olamit
(74) *Attorney, Agent, or Firm* — CIONCA IP Law P.C.

(57) ABSTRACT

A method of measuring a Heating, Ventilating Air Conditioning (HVAC) system airflow across an evaporator coil or heat exchanger comprising drilling a single hole in a near side of a plenum, a duct, or a box and inserting an anemometer probe in the single hole, and taking at least one airflow measurement selected from the group consisting of: a near side airflow, a centerline airflow, and a far side airflow. Calculating an average HVAC system airflow based on the at least one airflow measurement. A second method determines which side of the plenum, duct, or box has higher airflow based the near side airflow, the centerline airflow, and the far side airflow and measures more than 50% of the airflow measurements on the higher airflow side and calculates an average HVAC system airflow based on a sum of the airflow measurements divided by the total number of airflow measurements.

15 Claims, 11 Drawing Sheets

Top View

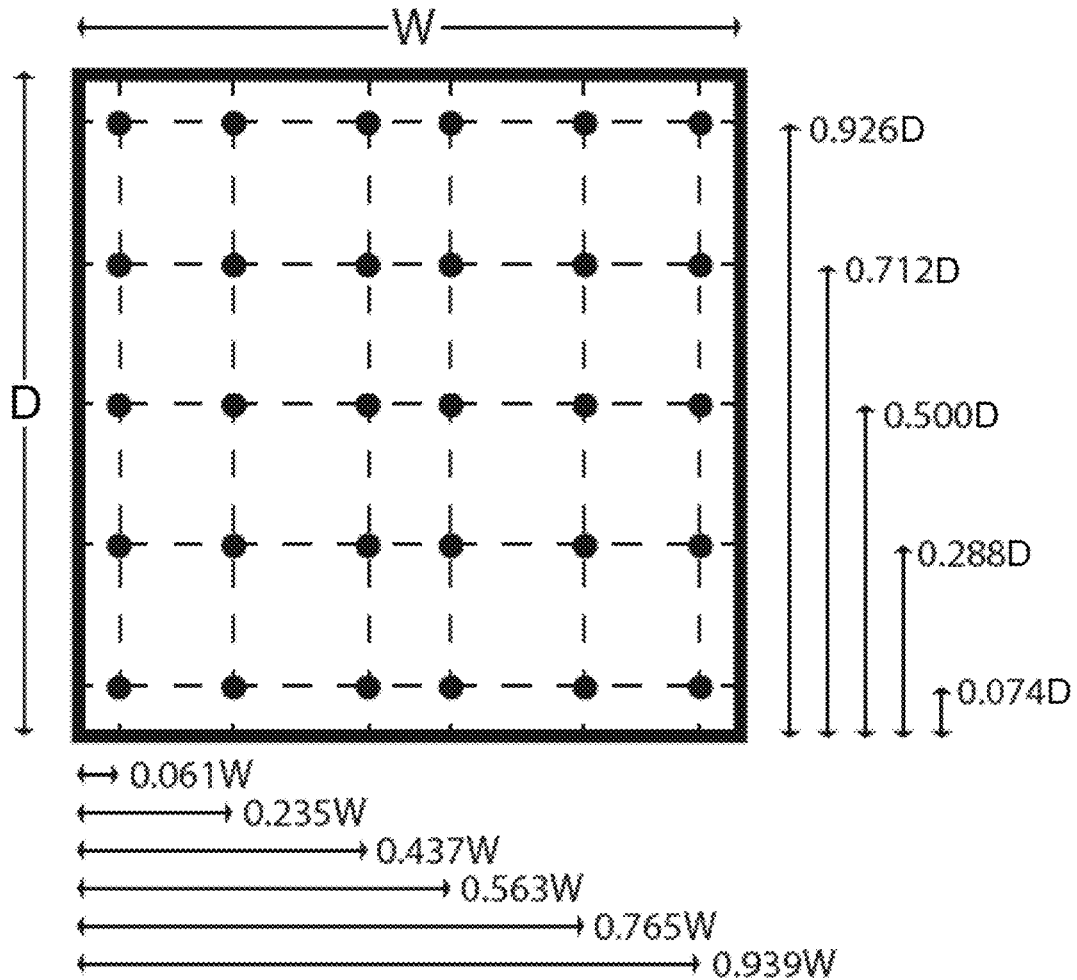
Figure 8 – Prior Art
| Traverse locations using log-Tchebycheff rule in a rectangular duct | | |
|---|---|---|
| Width (W) of Duct | # traverse lines | Depth (D) from Near Wall % of Side Length (W) |
| <30 in. (76 cm) | 5 | 7.4%, 28.8%, 50%, 71.2%, 92.6% |
| 30 to 63 in. (76-160 cm) | 6 | 6.1%, 23.5%, 43.7%, 56.3%, 76.5%, 93.9% |
| >63 in. (160 cm) | 7 | 5.3%, 20.3%, 36.6%, 50%, 63.4%, 79.9%, 94.7% |
Figure 9 – Prior Art

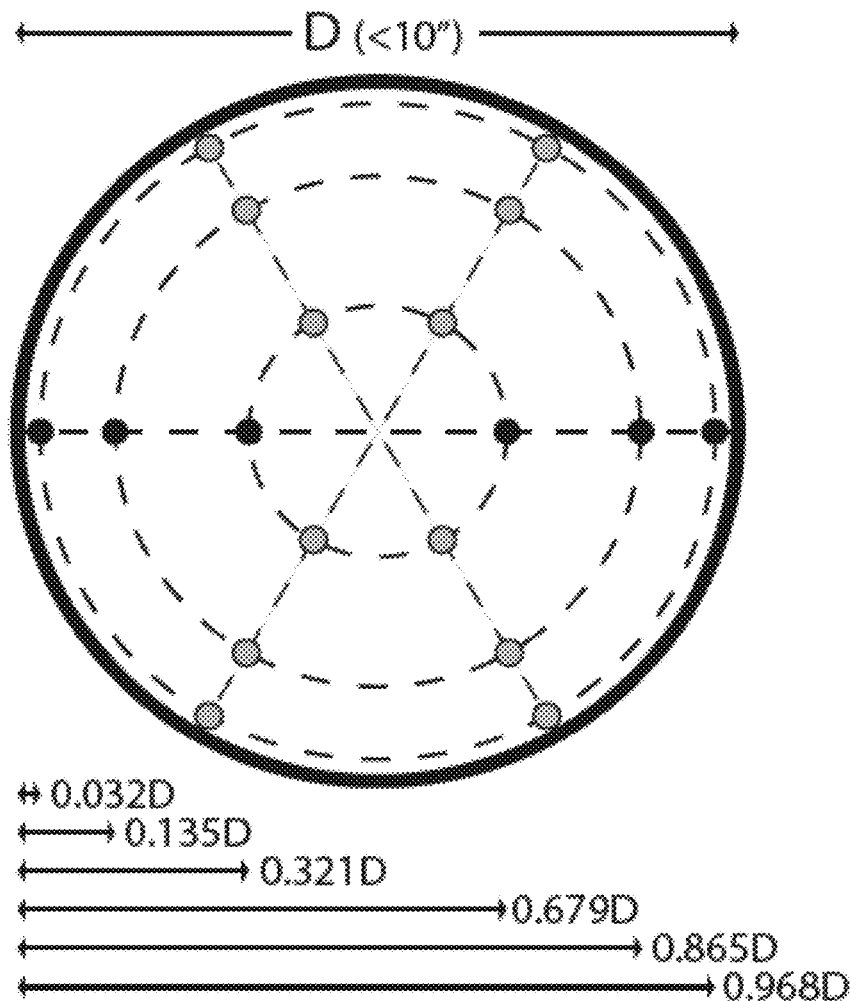
Figure 10 – Prior Art
| Log linear rule for Log-Tchebycheff traverse points on two diameters for a round duct |||
| --- | --- | --- |
| Diameter | # of points per dia. | Distance from Near wall in % of Diameter (D) |
| <10 in. (25.4 cm) | 6 | 3.2%, 13.5%, 32.1%, 67.9%, 86.5%, 96.8% |
| ≥10 in. (25.4 cm) | 10 | 1.9%, 7.7%, 15.3%, 21.7%, 36.1%, 63.9% |
Figure 11 – Prior Art

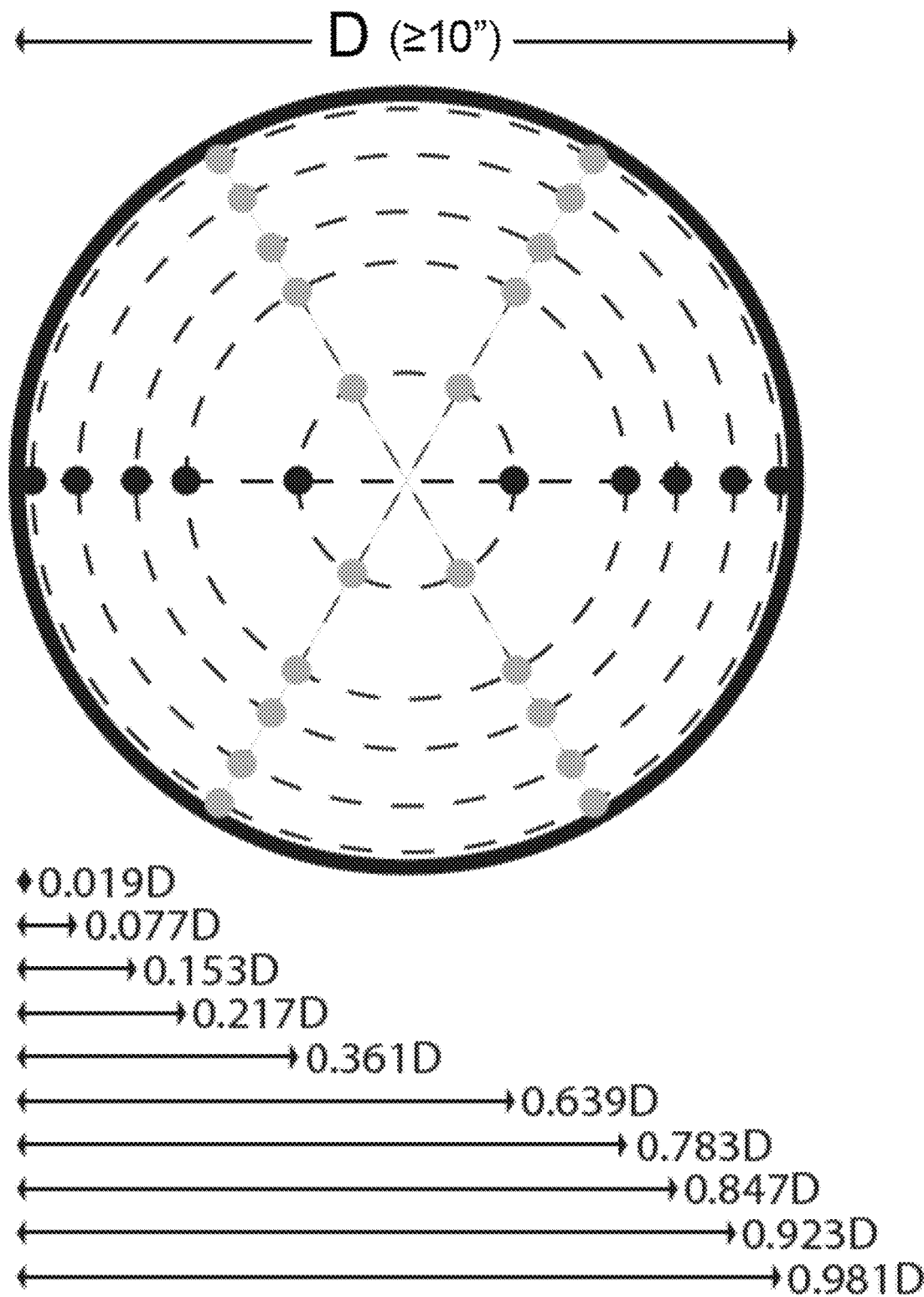
Figure 12 – Prior Art

| Description | Simple Airflow Method (CFM) | Log-Tchebycheff Anemometer Log-T (CFM) | Fan-powered flow hood Duct Blaster (CFM) | Pressure grid TrueFlow (CFM) | Balometer flow capture hood (CFM) |
|---|---|---|---|---|---|
| 5-ton AC | 1538 ± 52 | 1224 ± 53 | 1452 ± 35 | 1509 ± 21 | 1560 ± 78 |
| 5-ton heating | 1213 ± 64 | 986 ± 16 | 1108 ± 12 | 1125 ± 17 | 1140 ± 68 |
| 5-ton fan only | 814 ± 45 | 668 ± 22 | 802 ± 16 | 810 ± 11 | 790 ± 47 |
| 4-ton unit heating | 1158 ± 57 | 924 ± 92 | 1144 ± 16 | 1077 ± 53 | 1071 ± 53 |
| 3-ton AC | 1118 ± 44 | 917 ± 100 | 1288 ± 64 | 1342 ± 80 | 1265 ± 75 |
| 3-ton AC fan only | 628 ± 21 | 565 ± 50 | 654 ± 32 | 638 ± 38 | 680 ± 34 |
| Relative Accuracy | 1.0 ± 0.04 | 0.82 ± 0.05 | 1.0 ± 0.03 | 1.01 ± 0.03 | 1.01 ± 0.06 |

Figure 13

SIMPLE AIRFLOW MEASUREMENT METHOD

TECHNICAL FIELD

This patent specification relates to methods for measuring airflow in for a Heating, Ventilating, Air Conditioning (HVAC) system.

BACKGROUND

Buildings are cooled and/or heated by Heating, Ventilating, Air Conditioning (HVAC) systems to maintain comfortable conditions for occupants. Low airflow reduces thermal comfort and efficiency and increases operating time and energy use. HVAC system manufacturers require a design airflow across the evaporator or heat exchanger to provide the rated cooling or heating capacity.

Known methods for measuring airflow in Cubic Feet per Minute (CFM) or liters per second (LPS) include a digital hotwire anemometer, fan-powered flow hood (Duct Blaster), pressure grid (Trueflow), or balometer flow capture hood.

Known hot-wire anemometer methods may require three to six or more holes in the HVAC plenum or duct and 30 or more airflow measurements at multiple insertion depths to calculate an average airflow. Depending on the plenum/duct setup, these holes may need to be covered/repaired prior to returning to standard HVAC operation, which may increase the amount of time associated with performing these known methods of measuring airflow, while causing wear and tear on the plenum/duct.

The known hot-wire anemometer methods can take 30 to 60 minutes or longer. Furthermore, the known fan-powered flow hood, pressure grid, and balometer flow capture hood methods can also take 30 to 60 minutes or longer, and also require a plurality of holes to be drilled into the plenum or duct.

U.S. Pat. No. 7,891,573 (Finkam '544) discloses a method for controlling airflow into a building and a control algorithm for comparing actual volumetric airflow with measured airflow.

Fieldpiece Inc. published 2011. "In-Duct Hot Wire Anemometer Operator's Manual Model STA2." Date: 2011. Pages: 4. https://resources.fieldpiece.com/wp-content/uploads/2020/12/Opman-STA2v19.pdf. 1636 W Collins Ave, Orange, CA 92867. USA. Fieldpiece manufactures a hot-wire anemometer STA2 product and a user manual based on a known log-Tchebycheff airflow measurement method with thirty (30) or more traverse measurement points requiring drilling 4 to 6 holes in a rectangular or a circular plenum or duct. This log-Tchebycheff airflow measurement method, shown in FIG. 8-12, shares the deficiencies of the known methods for measuring airflow, including needing a plurality of holes to be drilled into the duct/plenum and being time consuming.

The American National Standards Institute (ANSI) and American Society of Heating, Refrigeration Air Conditioning (ASHRAE) ANSI/ASHRAE Standard 221-2020 ANSI/ASHRAE Standard 221-2020 Test Method to Field-Measure and Score the Cooling and Heating Performance of an Installed Unitary HVAC System measures airflow to evaluate performance.

Known airflow measurement methods require time-consuming and complicated measurements and/or measurement equipment and thus a method for providing simple, fast and accurate methods for measuring airflow is required.

SUMMARY

The simple airflow measurement method measures a Heating, Ventilating, Air Conditioning (HVAC) system airflow across an evaporator coil or a heat exchanger coil in Cubic Feet per Minute (CFM), liters per second (LPS), or cubic meters per second (CMS). The method uses a hot-wire anemometer sensor inserted into a single hole in a plenum, a duct, or a box wherein the box is reversibly engaged with a return air register or a supply air register to measure the airflow across the evaporator or the heat exchanger coil.

In accordance with one aspect, an airflow measurement method is described wherein the hot-wire anemometer sensor is inserted into a single access hole near the center of the plenum, the duct, or the box to measure the airflow at three locations comprising a near side of the access hole, a far side of the access hole, and a centerline between the near and the far side of the access hole. The method then calculates the average of the three measurements to calculate an average airflow in the plenum, the duct, or the box. In another aspect, the method makes more than 50 percent of measurements on the side of the plenum or duct, or box with the higher airflow and the remaining airflow measurements are made on the opposite side with the lower airflow and averages measurements to calculate the average airflow in the plenum, the duct, or the box.

BRIEF DESCRIPTION OF DRAWINGS

The above and other aspects, features and advantages will be more apparent from the following brief description of the drawings.

FIG. 8 shows a prior art schematic diagram of known log-Tchebycheff method with thirty (30) or more traverse measurement points in a rectangular duct to insert a hot-wire anemometer to measure HVAC airflow.

FIG. 9 shows a prior art table of traverse locations for the rectangular duct of FIG. 8 for a known log-Tchebycheff method for less than (<) 30 inches, 30 to 63 inches, and greater than 63 inches.

FIG. 10 shows a prior art schematic diagram of known log-Tchebycheff method with thirty (30) or more traverse measurement points in a circular duct less than 10 inches diameter to insert a hot-wire anemometer to measure HVAC airflow.

FIG. 11 shows a prior art table of traverse locations for the circular duct of FIG. 10 for a known log-Tchebycheff method for less than (<) 10 inches and greater than or equal to (2) 10 inches.

FIG. 12 shows a prior art schematic diagram of known log-Tchebycheff airflow measurement method with thirty (30) or more traverse measurement points in a circular duct 210 inches diameter to insert a hot-wire anemometer to measure HVAC airflow.

FIG. 13 provides a summary of airflow measurements (in CFM) comparing the accuracy of the disclosed airflow measurement method to those of the more complicated log-Tchebycheff (log-T), fan-powered flow hood (Duct Blaster), pressure grid (Trueflow), or balometer flow capture hood methods.

Corresponding reference characters indicate corresponding components throughout several views of the drawings.

DETAILED DESCRIPTION

The following description is of the mode presently contemplated for implementing the airflow measurement method to measure airflow in Cubic Feet per Minute (CFM), or other suitable units, for a Heating, Ventilating, Air Conditioning (HVAC) system. The Système international d'unités (SI) for airflow are liters per second (LPS) and 1 CFM equals roughly 0.47194745 LPS. As is understood, the airflow units of measurement are a volumetric airflow rate.

Where the terms "about" or "generally" are associated with an element of the description, it is intended to describe a feature's appearance to the human eye or human perception, and not a precise measurement, for example within plus or minus 5%.

The simple airflow measurement method is described using flow charts, equations, and calculations. The equations and calculations can be implemented on a computer, mobile, or web-based software application including, but not limited to Microsoft Excel, Apple Numbers, Google Sheets, or Wordperfect Office Suite Quatro Pro. The logic equations or functions can be implemented in programming languages such as Swift, Android, Visual Basic, C++, Python, Java, TypeScript, Python, C#, Ruby, PHP, or other language.

Figure 1:
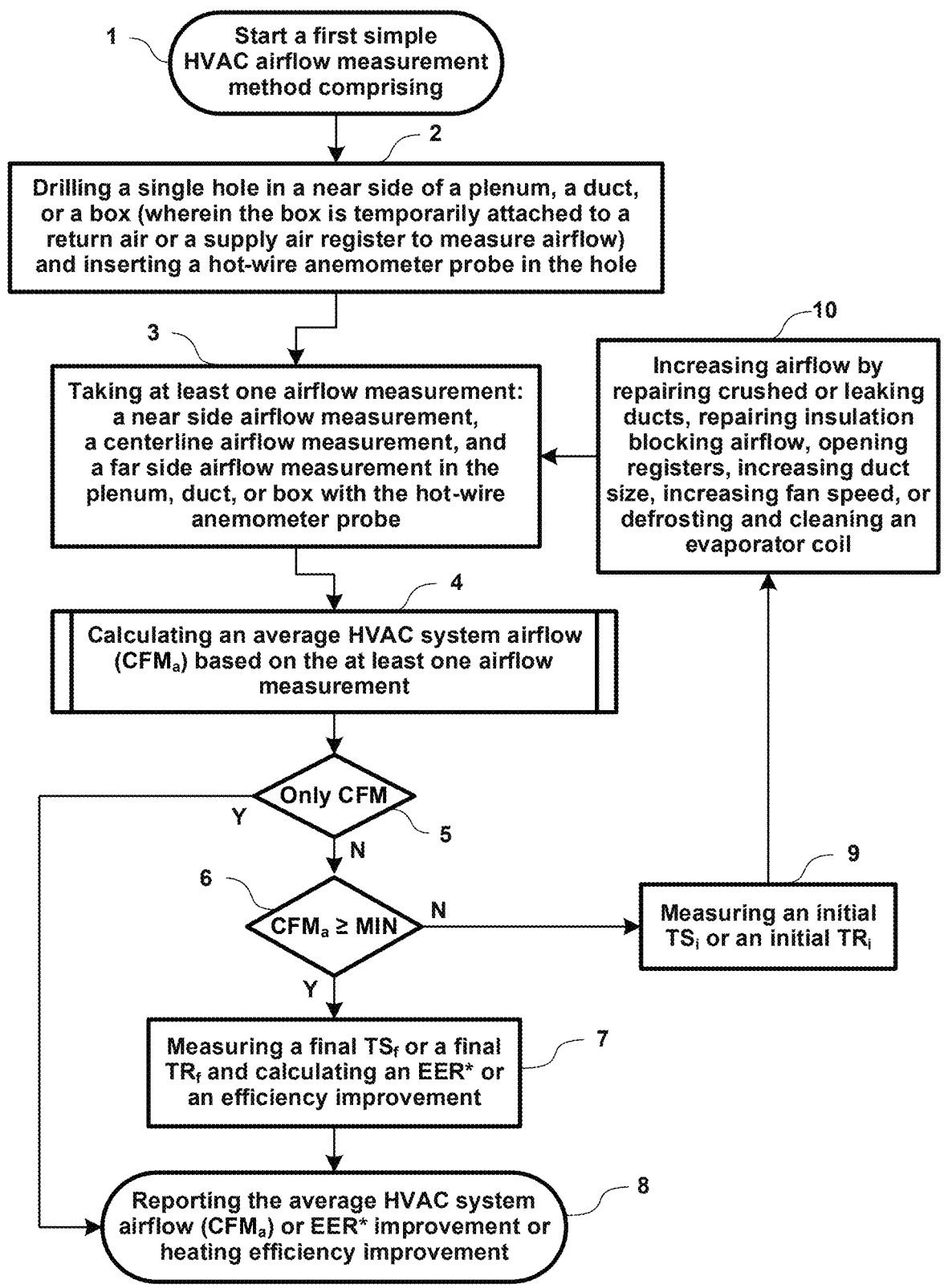
FIG. 1 provides a flow chart of a first simple airflow measurement method to measure a Heating, Ventilating, Air Conditioning, (HVAC) system airflow across an evaporator in Cubic Feet per Minute (CFM) or other volumetric airflow rate units.

FIG. 1 provides a flow chart of a first simple airflow measurement method to measure a Heating, Ventilating, Air Conditioning (HVAC) system airflow across an evaporator or heat exchanger coil. In an embodiment, the evaporator coil and/or the heat exchanger are disposed within the HVAC system and configured to change a temperature of the HVAC system airflow through the HVAC system. At step 1, the first simple airflow measurement method ("first airflow measurement method") starts, before proceeding to step 2. At step 2, the method comprises drilling a single access hole 101 in a supply or return plenum or a supply or return duct (see FIG. 4) or a single access hole in a box 41 (see FIG. 3). In an embodiment, the box 41 is temporarily attached or otherwise reversibly engaged to a wall, a ceiling, or a door surrounding a return air register or a supply air register (see FIG. 3). In said embodiment, the box is temporarily attached to said structure with masking tape, other tape, magnets, hook and loop, or other means. In an embodiment, a hot-wire anemometer sensor 142 is inserted into a single access hole 125 of a near side 131 (see FIG. 5) of a plenum or a duct of a supply plenum 105 (see FIG. 4), or a box 41 (see FIG. 3). Known methods require drilling multiple holes and taking significantly more measurements, which can take 30 to 60 minutes or more without improving accuracy over the method of measuring an HVAC system airflow disclosed herein. The herein disclosed airflow measurement method may only take 5 minutes and may only drill one hole in the plenum, the duct, or the box, which causes less damage to the plenum, duct, or box, respectively. Furthermore, using the box to measure airflow, wherein the box is temporarily attached/reversibly engaged with masking tape or other method to a wall, a ceiling, or a door surrounding a return air or a supply air register, is less intrusive, and causes less damage to the plenum or the duct. Step 2 also comprises inserting the hot-wire anemometer sensor through the single access hole in the near side of the plenum, the duct, or the box. It should be understood that the near side is the side nearest to the single access hole.

As seen in FIG. 1, after step 2, the method may proceed to step 3. Step 3 of FIG. 1 describes performing at least one action selected from the group consisting of: measuring and recording a near side airflow 127 (see FIG. 5) at a near side location, measuring and recording a depth centerline airflow 133 (see FIG. 5) at a depth centerline location and measuring and recording a far side airflow 135 (see FIG. 5) at a far side location.

As seen in FIG. 1, after step 3, the method may proceed to step 4. Step 4 of FIG. 1 describes calculating an average HVAC system airflow based on the at least one airflow measurement. In one embodiment, the average HVAC system airflow may be calculated based on the at least one airflow measurement selected from a group consisting of: the near side airflow 127 (a near side airflow measurement), the depth centerline airflow 133 (a depth centerline airflow measurement), and the far side airflow 135 (a far side airflow measurement). In another embodiment, the average HVAC system airflow may be calculated based on the average of the near side airflow 127, the depth centerline airflow 133, and the far side airflow 135 (see FIG. 5). Following step 4, the method goes to Step 5. At step 5, if only measuring airflow (CFM) is Yes (Y), (e.g., a user of the method only wants to measure airflow, not efficiency), the method goes to step 8. Step 8 comprises reporting the average HVAC system airflow ($CFM_a$). If step 5 is No (N), the method goes to an optional step 6 to evaluate whether the average HVAC system airflow is greater than or equal to a minimum airflow ($CFM_a \geq MIN$). If optional step 6 is No (N) (e.g., $MIN<CFM_a$), the method proceeds to an optional step 9 to measure an initial temperature split ($TS_i$) across an evaporator coil for a cooling mode, which is equal to a return air drybulb temperature minus a supply air drybulb temperature in degrees Fahrenheit (° F.). In an alternative embodiment, the method proceeds to an optional step 9 to measure an initial heating temperature rise (TR) across a heat exchanger for a heating mode, which is equal to an initial supply air drybulb temperature minus an initial return air drybulb temperature (° F.). The heating mode or the cooling mode may be based on the operation of a heat exchanger (heating mode) or an evaporator coil (cooling mode) within the HVAC system. After Step 9, the method proceeds to an optional Step 10 to increase airflow in the duct/plenum. The method to increase the airflow may comprise repairing crushed or leaking ducts, repairing insulation that is blocking the airflow, opening registers, increasing duct size (diameter or cross-sectional area to reduce a static pressure), increasing fan speed, and/or defrosting and cleaning an evaporator coil. Increasing fan speed may comprise connecting the high-speed wire from the fan motor to the cooling speed connector (terminal or connector) or speed control taps or switches. After optional Step 10, the method may return to Step 3 to calculate a final average HVAC system airflow ($CFM_a$).

When step 6 is Yes (Y) (e.g., $CFM_a \geq MIN$, the HVAC system airflow ($CFM_a$) is greater than or equal to a minimum HVAC system airflow (MIN)), the method goes to optional Step 7. At step 7, the method measures a final temperature split ($TS_f$) across the evaporator coil in cooling mode based on a final return air drybulb temperature minus a final supply air drybulb temperature (° F.). The method calculates an energy efficiency ratio (EER*) improvement, such as a cooling efficiency improvement, based on measurements of an initial average HVAC system airflow ($CFM_{ai}$) and an initial temperature split ($TS_1$) across the evaporator coil and a final average HVAC system airflow ($CFM_{af}$) and a final temperature split ($TS_f$) across the evaporator coil per the following equation shown in Eq. 1.

$$EER^* = \text{Improvement} = C^*\left[1 - \frac{CFM_{a_i} * TS_i}{CFM_{a_f} * TS_f}\right] \quad \text{Eq. 1}$$

Where:
C=a coefficient based on laboratory tests between 0 and 1 preferably 0.86 (dimensionless),
$CFM_{ai}$=Initial average HVAC system airflow before the airflow repairs,
$TS_i$=Initial Temperature split in cooling mode before airflow repairs, wherein TS is equal to the initial return air drybulb temperature minus the initial supply air drybulb temperature in ° F.,
$CFM_{af}$=Final average HVAC system airflow after the airflow repairs, and
$TS_f$=Final Temperature split in cooling mode after airflow repairs, wherein $TS_f$ is equal to the final return air drybulb temperature minus the final supply air drybulb temperature in ° F.

Alternatively, the method may be used in a heating mode to calculate a heating efficiency improvement shown in Eq. 2. The heat efficiency improvement is based on the final temperature rise ($TR_f$) across the heat exchanger which is equal to a final supply air drybulb temperature minus a final return air drybulb temperature (° F.), and initial temperature rise ($TR_i$) across the heat exchanger, which is equal to an initial supply air drybulb temperature minus an initial return air drybulb temperature (° F.).

$$\text{Heating efficiency Improvement} = C^*\left[1 - \frac{CFM_{a_i} * TR_i}{CFM_{a_f} * TR_f}\right] \quad \text{Eq. 2}$$

Where:
C=a coefficient based on laboratory tests between 0 and 1 preferably 0.86 (dimensionless),
$CFM_{ai}$=Initial average HVAC system airflow before the airflow repairs,
$TR_i$=Initial Temperature rise in heating mode before airflow repairs, wherein $TR_i$ is equal to the initial supply air drybulb temperature minus the initial return air drybulb temperature in ° F.,
$CFM_{af}$=Final average HVAC system airflow after the airflow repairs, and
$TR_f$=Final Temperature rise in heating mode after airflow repairs, wherein $TR_f$ is equal to the final supply air drybulb temperature minus the final return air drybulb temperature in ° F.

From step 7, the method may proceed to step 8 and report the average HVAC system airflow measurement in volumetric airflow rate units (CFM, LPS, CMS, or other appropriate units) or the cooling efficiency improvement (the EER* improvement) or the heating efficiency improvement. It should be noted that both the cooling efficiency improvement and the heating efficiency improvement may be referred to as "efficiency improvements"

Figure 2:
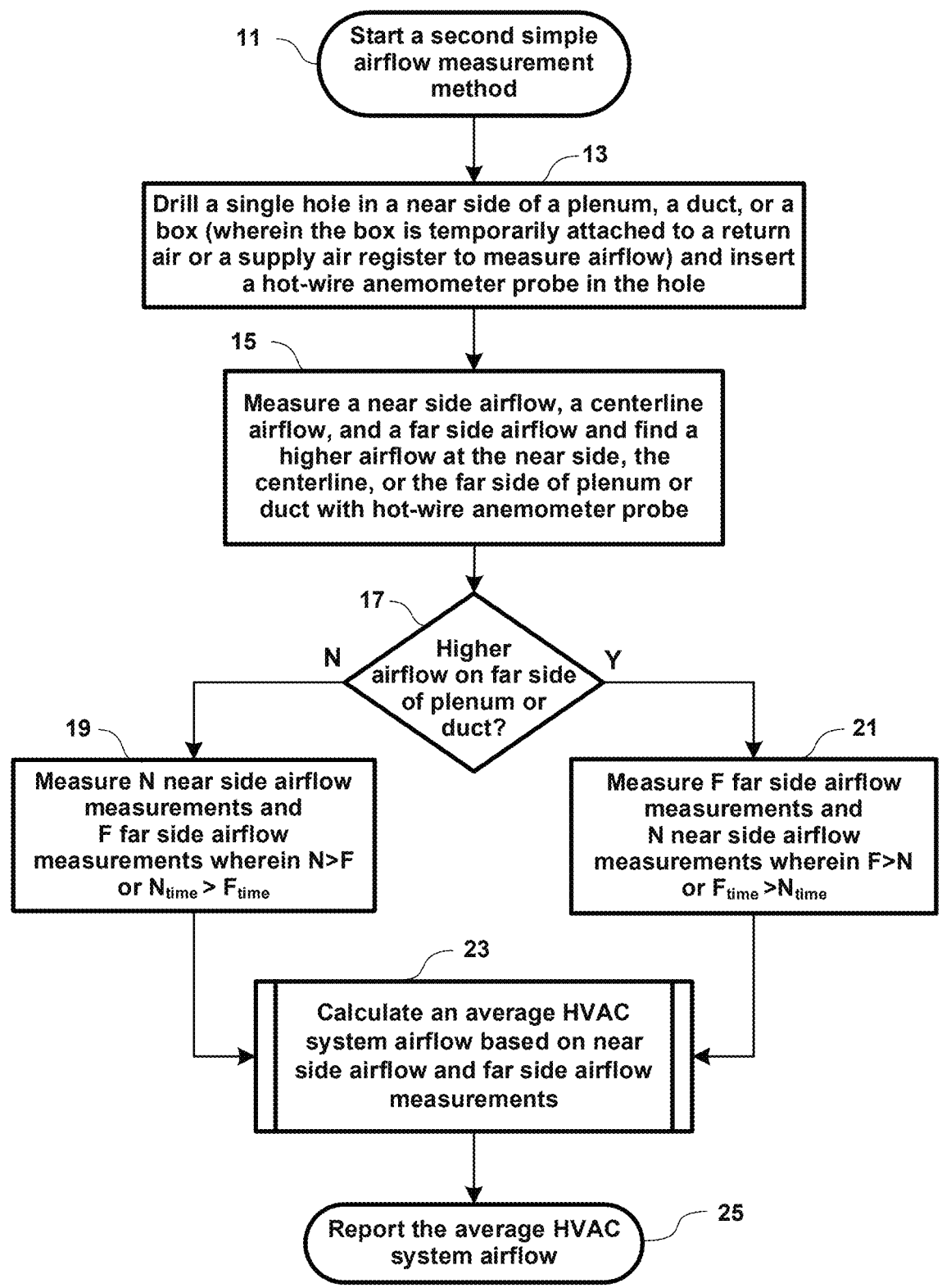
FIG. 2 provides a flow chart of a second simple airflow measurement method to measure the HVAC system airflow across an evaporator in CFM or other units.

FIG. 2 provides a flow chart of a second simple airflow method to measure an HVAC system airflow across an evaporator or heat exchanger coil. At step 11, the second simple airflow measurement method ("second airflow measurement method") starts, before proceeding to step 13. At step 13, the method drills a single access hole 101 in a supply or return plenum or a supply or return duct (see FIG. 4) or drills a single access hole 49 in a box 41 (see FIG. 3). In an embodiment, the box 41 is temporarily attached to a wall, a ceiling, or a door surrounding a return air register or a supply air register as described above (see FIG. 3). Furthermore, for step 13, a hot-wire anemometer sensor 142 is inserted into a single access hole 125 of a near side 131 (see FIG. 5) of a plenum, a single access hole 101 of a duct of a supply plenum 105 (see FIG. 4), or single access hole 49 a box 41 (see FIG. 3).

Figure 5:
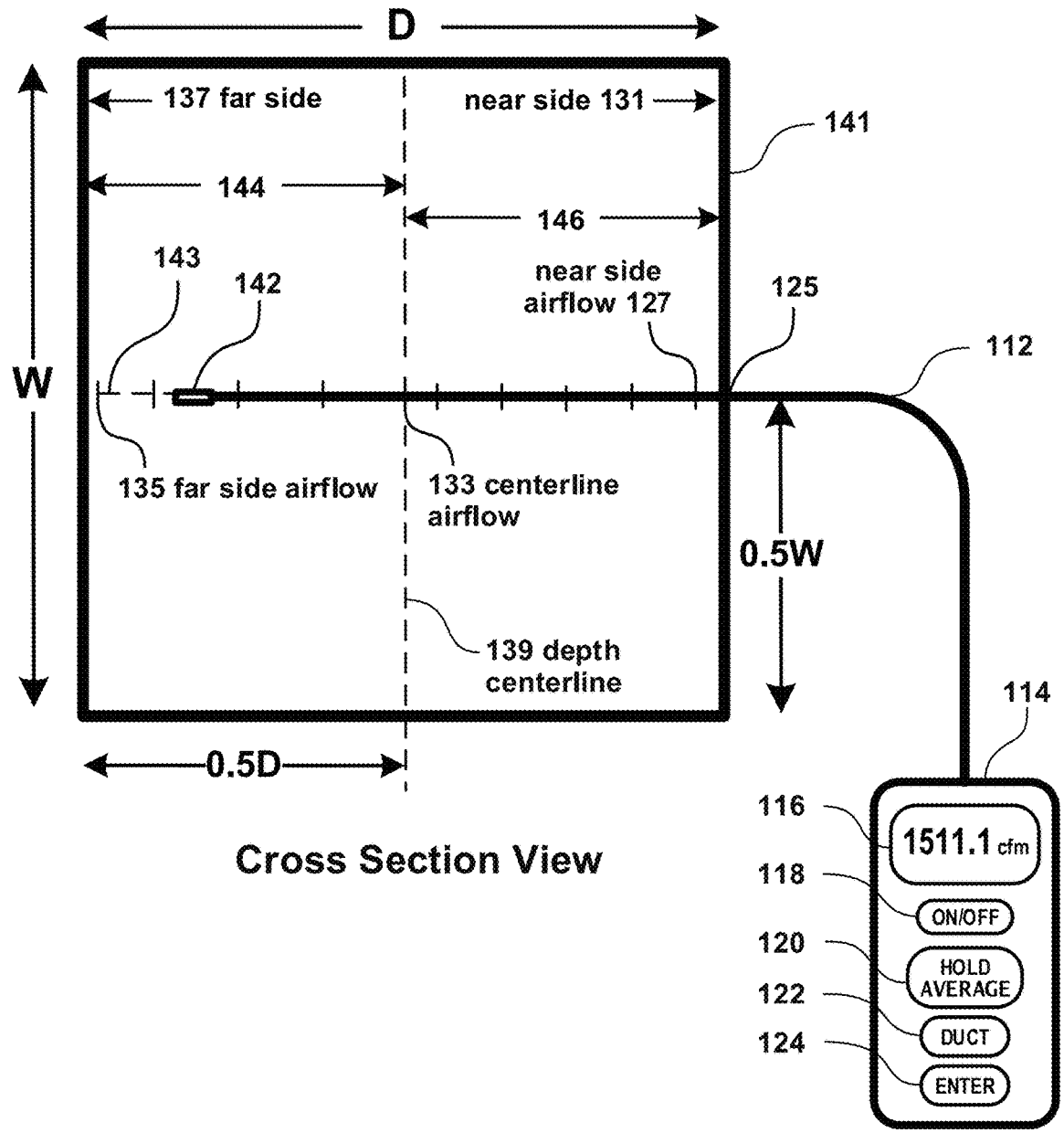
FIG. 5 shows a schematic diagram of the simple airflow method showing the anemometer probe inserted into a single access hole to measure the HVAC airflow.

Following step 13 of FIG. 2, Step 15 describes measuring and recording an airflow value of the near side airflow 127 at the near side 131, a depth centerline airflow 133 at the depth centerline 139 (i.e., "centerline"), and a far side airflow 135 at a far side 137 (see FIG. 5) of the plenum, the duct, or the box using the hot-wire anemometer sensor 142 (see FIG. 5). Following step 15, Step 17 checks which side of the corresponding structure (e.g., the plenum or duct) has higher airflow. If Step 17 determines the far side has the higher airflow than the near side, then the method proceeds to step 21. At step 21, the method measures "F" far side airflow measurements and "N" near side airflow measurements wherein F>N (entered values). Similarly, in an embodiment, the method measures airflow for a longer time duration on the far side than the near side, wherein the $F_{time}$ is greater than $N_{time}$. It should be understood that the variable "F" may be used to represent the quantity of airflow measurements taken on the F far side 144 (see FIG. 5) of the corresponding structure, whereas the variable "N" may be used to represent the quantity of airflow measurements taken on the N near side 146 (see FIG. 5) of the corresponding structure. Similarly, the variable "$F_{time}$" may be used to represent the duration of time spent measuring airflow in the far side of a structure, whereas the variable "$N_{time}$" may be used to represent the duration of time spent measuring the airflow in the near side of the structure.

If Step 17 of FIG. 2 determines the near side has higher airflow than the far side, then the method proceeds to step 19. At Step 19 the method measures N near side airflow measurements and F far side airflow measurements wherein N>F (entered values) or measures airflow for a longer time duration on the near side than the far side wherein the $N_{time}$, is greater than the $F_{time}$. As is understood, higher airflow may occur on the near side 131, the depth centerline 139, or the far side 137 (see FIG. 5) depending on location and positioning of a blower fan outlet, branch ducts, or duct designs with respect to the plenum or duct or the air filter (not shown).

In an embodiment, the second simple airflow measurement method determines which side of the centerline of the plenum, the duct, or the box provides higher airflow values. The higher airflow might alternatively be at the centerline, so the method also compares to the depth centerline airflow value to the near side and far side values. In an embodiment, wherein airflow at the centerline of the plenum/duct is higher than airflow at the corresponding near side or far side, more than 50% of airflow measurements may be taken at the centerline of the plenum or duct, with the remainder of the airflow measurements taken at either side of the centerline. As such, when airflow is highest at the depth centerline, the depth centerline airflow may be referred to as the "higher airflow side" whereas the near and far sides may be referred to as lower airflow sides. In an embodiment, the second simple airflow measurement method of FIG. 2 measures more than 50% of the airflow values on the higher airflow side and measures less than 50% of airflow values (measurements) on the lower airflow side(s). The second method calculates the average HVAC system airflow based on a sum of the measured airflow values divided by a total number of measured airflow values. Following step 19 or 21, step 23 of FIG. 2 calculates the average HVAC system airflow based on the N near side airflow measurements and F far side airflow measurements. In an alternative embodiment, wherein airflow values are highest at the centerline, in addition to the N near side airflow measurements and the F far side airflow measurements, the airflow measurements may include C centerline airflow measurements ("depth centerline airflow measurements"), wherein C is the quantity of airflow measurements taken at the depth centerline 139 (see FIG. 5). Similarly, for time duration-based embodiments of the simple airflow measurement method, in addition to the $N_{time}$ and $F_{time}$ measurements, the time duration measurements may include $C_{time}$ (the duration of time spent measuring airflow at the depth centerline of a structure). After step 23, the second simple airflow measurement method concludes with step 25 wherein the method reports the calculated average airflow measurement.

Figure 3:
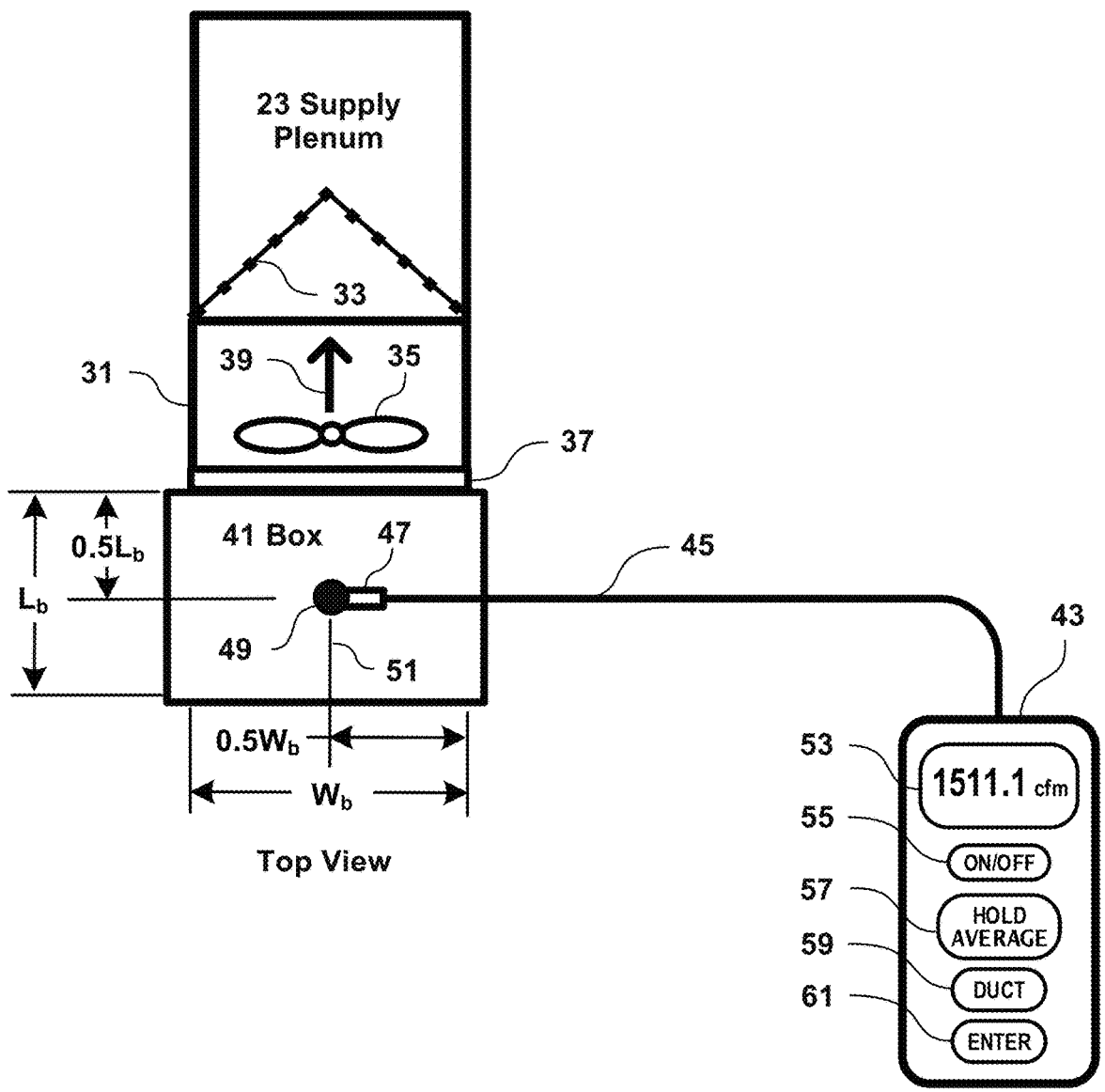
FIG. 3 shows a schematic diagram of an HVAC system without a return plenum with a box temporarily attached with masking tape or other attachment method to a wall, a ceiling, or a door surrounding a return or a supply air register, wherein the box has a single access hole to insert an anemometer probe to measure an HVAC airflow.

FIG. 3 shows a top view schematic diagram of an HVAC system showing a Forced Air Unit ("FAU") 31 containing an HVAC fan 35 which produces an average HVAC system airflow 39 across an evaporator coil 33 or a heat exchanger coil. In the embodiment, the FAU 31 is located in a closet, a ceiling, or a cabinet and does not have a return plenum. In an embodiment, a box 41 is temporarily attached to a return grill 37 ("return air register") to measure the average HVAC system airflow 39, which is measured in cubic feet per minute (CFM), liters per second (LPS), cubic meters per second (CMS), or other volumetric airflow rate units. The box 41 may be a temporary cardboard box. In an embodiment, the box 41 has a single access hole 49 located on one side of the box 41 at approximately 0.5 times a width $W_b$ and 0.5 times Length $L_b$ (e.g., at the width centerline 51 of the corresponding side of the box 41, as shown in FIG. 3). The depth of the box (not shown) is generally equal to or longer than the width $W_b$ and the cross sectional area of the box 41 is larger than the cross sectional area of the return grill 37. The box 41 may be secured with masking tape to a wall, a ceiling, or a door surrounding the return grill 37 as described above. The box 41 overlaps with the return grill 37 to capture airflow through the return grill 37. The single access hole 49 may be larger or smaller than 5/16-inch diameter and within +/−6 inches of the width centerline 51 of the box 41. The box 41 may also be configured to overlap with a supply grill ("supply air register").

FIG. 3 shows an anemometer 43 and an anemometer sensor 47 inserted in the single access hole 49 in the box 41 to measure the HVAC airflow 39 across an evaporator coil 33. The anemometer 43 may be in electrical communication with the anemometer sensor 47 through the anemometer probe 45, such that anemometer 43 is configured to receive the corresponding signals from the anemometer sensor 47 to measure airflow rates at the position of the anemometer sensor 47. The single access hole 49 may be located near a centerline 51 of the box 41. FIG. 3 shows an anemometer 43 with a display 53 (showing a 1511.1 CFM average measurement), an on/off button 55, a hold/average button 57, a duct button 59 to enter a duct type (rectangular or circular) and dimensions (height×width or diameter), and an enter button 61 to capture an airflow value or average airflow values over a time function. For the time function, the airflow may be averaged or based on a first airflow measurement at a near side (to the single access hole 49), a second airflow measurement at a centerline (half way across a depth of the box 41), and a third airflow measurement at a far side (away from the single access hole 49). In an embodiment, the total time to measure airflow using the simple airflow method is less than 5 minutes including drilling a single 5/16-inch diameter hole in the plenum, the duct, or the box 41.

Figure 4:
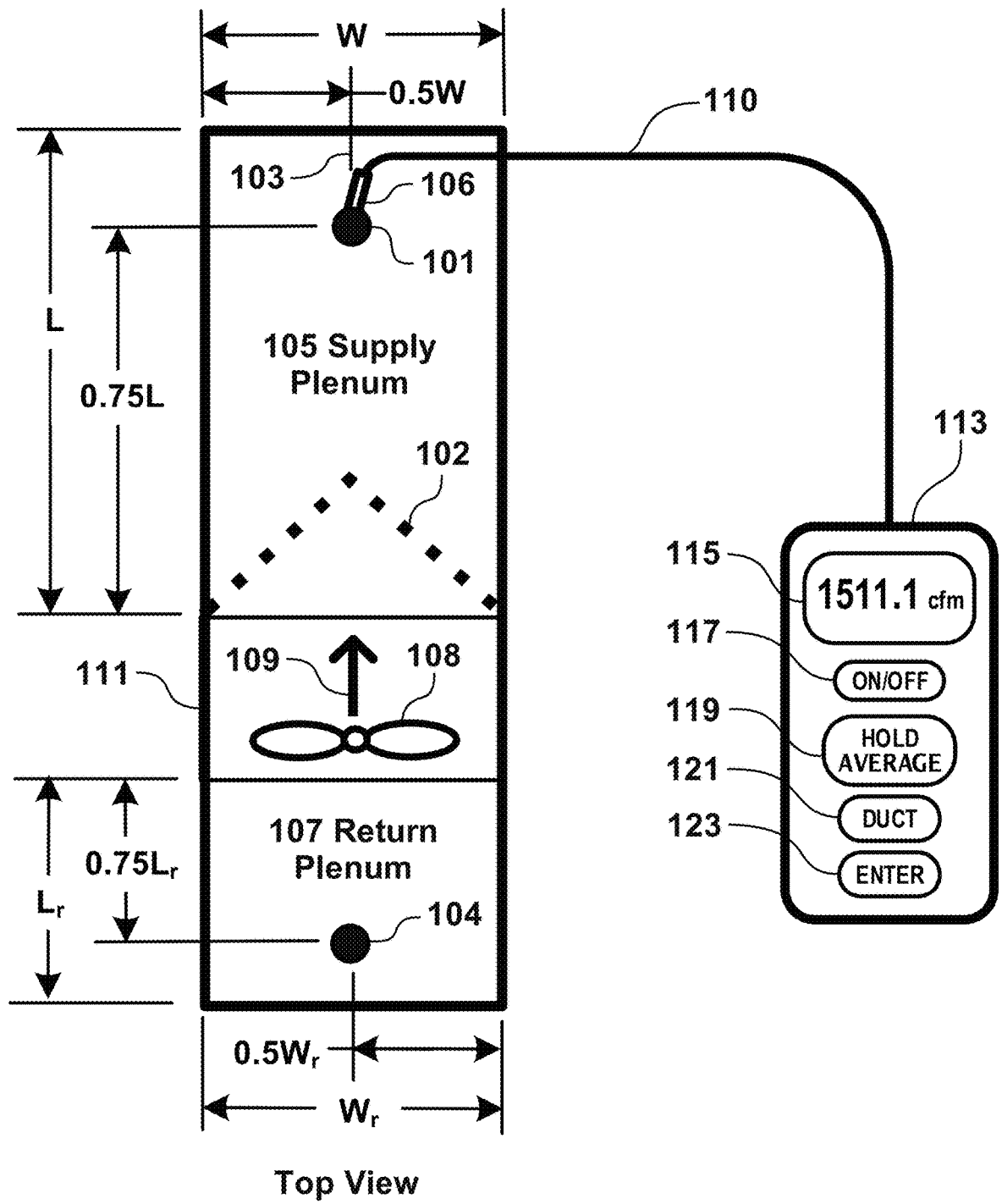
FIG. 4 shows a schematic diagram of an HVAC system showing a single supply access hole to insert a hot-wire anemometer probe to measure an HVAC airflow or a single return access hole to insert a hot-wire anemometer probe to measure the HVAC airflow.

FIG. 4 shows a top view schematic diagram of an HVAC system showing a single access hole 101 (typically 5/16" diameter) in a supply plenum 105 to insert a hot-wire anemometer probe 110 and a hot-wire anemometer sensor 106 into the supply plenum 105 (or a supply duct) to measure an HVAC system airflow 109 across an evaporator coil 102 or heat exchanger coil with an anemometer 113. If present, an existing access hole may also be used as the single access hole 101 for the hot-wire anemometer sensor 106 to be inserted into the supply plenum 105, as applicable. The single access hole 101 is preferably located on a width centerline 103 of the supply plenum 105. The lateral distance is based on 0.5 times a Width (W) of the supply plenum 105 (or a duct) with a Length (L). The single access hole 101 may further be located longitudinally 0.75 times a Length (L) of the supply plenum 105 from a Forced Air Unit or an FAU 111 containing an HVAC fan 108 which produces the HVAC system airflow 109. Alternatively, the single access hole 101 may be located approximately 0.75 times W and 0.75 times L. The single access hole 101 may be larger or smaller than 5/16-inch diameter and within +/−6 inches of the width centerline 103.

FIG. 4 also shows a return access hole 104 to insert a hot-wire anemometer sensor 106 in a return plenum 107 (or a return duct) to measure the HVAC system airflow 109 across an evaporator coil 102 with an anemometer 113. The location of the return access hole 104 is defined with respect to the return plenum 107 as laterally based on 0.5 times a Width of the return ($W_r$) and longitudinally 0.75 times a Length of the return (L). As noted above, the return access hole 104 may be located approximately 0.75 times W and 0.75 times $L_r$. The return access hole 104 may also be larger or smaller than 5/16-inch diameter and within +/−6 inches of the width centerline 103. In an embodiment, a temperature split (TS) across the evaporator coil based on a return air drybulb temperature minus a supply air drybulb temperature in degrees Fahrenheit (° F.) is measured with a first digital psychrometer probe inserted into the return access hole 104 or a return air register and a second digital psychrometer probe inserted into the single access hole 101 in the supply plenum or at a supply register.

FIG. 4 shows the anemometer 113 with a display 115 (showing a 1511.1 CFM average measurement), an on/off button 117, a hold/average button 119, a duct button 121 to enter duct type (rectangular or circular) and dimensions (height×width or diameter), and an enter button 123 to capture airflow values or average airflow values over time. For the time function, the airflow may be averaged or based on a longer duration on the near side than the far side wherein the $N_{time}$ is greater than the $F_{time}$ based on a higher airflow measured on the near side or vice versa if the higher airflow is measured on the far side. In an embodiment, the total time to measure airflow using the airflow measurement method is less than 5 minutes including drilling a single ⁵⁄₁₆-inch diameter hole in the plenum or duct.

FIG. 5 shows a schematic diagram of the airflow measurement method showing an anemometer 114, a hot-wire anemometer probe 112, and a hot-wire anemometer sensor 142 inserted into a single access hole 125 at a width centerline 143 located a lateral distance 0.5 times a Width W of a supply plenum 141 (or a supply duct). In an embodiment, the anemometer 114 is configured to measure an HVAC airflow (in CFM) based on measurements of a near side airflow 127 measured at near side 131, a depth centerline airflow 133 measured at a depth centerline 139, and a far side airflow 135 measured at a far side 137 of the supply plenum 141. FIG. 5 also shows the anemometer 114 measuring a higher airflow value on a higher airflow side or a lower airflow value on a lower airflow side measured between the depth centerline 139 and a near side 131 or the depth centerline 139 and the far side 137 of the supply plenum 141. While FIG. 5 refers to HVAC airflow measurements in a supply plenum, in an alternative embodiment, the airflow measurements may also be performed in a return plenum.

FIG. 5 shows the airflow measurement method measuring multiple airflow measurements on the far side, referred to as F far side 144 airflow measurements, and multiple airflow measurements on the near side, referred to as N near side 146 airflow measurements. If the disclosed airflow measurement method determines that the far side airflow 135 is greater than the near side airflow 127, then F>N (e.g., more airflow measurements will be taken on the far side of the corresponding structure). Alternatively, if F>N, then the disclosed airflow measurement method may instead measure the F far side 144 airflow measurements for a longer time duration than the N near side 146 airflow measurements, such that $F_{time}$ is greater than $N_{time}$. If the disclosed method determines that the near side airflow 127 is greater than the far side airflow 135, then N>F or the method measures the N near side 146 airflow measurements for a longer time duration than the F far side 144 airflow measurements, wherein the $N_{t}n$, is greater than the $F_{time}$. The herein disclosed method weights the airflow measurements to obtain a more accurate average airflow measurement of the HVAC airflow in the supply plenum 141 (or the supply duct). As noted above, the airflow measurements may also be performed in the return plenum or duct.

While the terms N (number of measurements taken on the near side) and $N_{time}$ (the amount of time spent taking near side measurements) are described herein, when N is greater than F, $N_{time}$ is also greater than $F_{time}$. As it takes additional time to take additional measurements, the number of measurements on a corresponding side is thus proportional to the amount of time spent taking measurements on the corresponding side. The same may also be described for the relationship between F and $F_{time}$, accordingly. As such, the discrepancy between amount of data collected between the near side and the far side (and the corresponding structure centerline measurements, as applicable) may be expressed in either number of measurements or time spent taking measurements, both of which articulate essentially the same relation.

As described hereinabove, FIG. 5 also shows an anemometer 114 with a display 116 (showing a 1511.1 CFM average measurement), an on/off button 118, a hold/average button 120, a duct button 122 to enter duct type (rectangular or circular) and dimensions (height×width or diameter), and an enter button 124 to capture airflow values or average airflow values over time. A higher airflow value may occur on near side 131 with lower airflow value on far side 137 depending on location and position of blower fan outlet, branch ducts, or duct designs with respect to the plenum or duct or the air filter (not shown).

Figure 6:
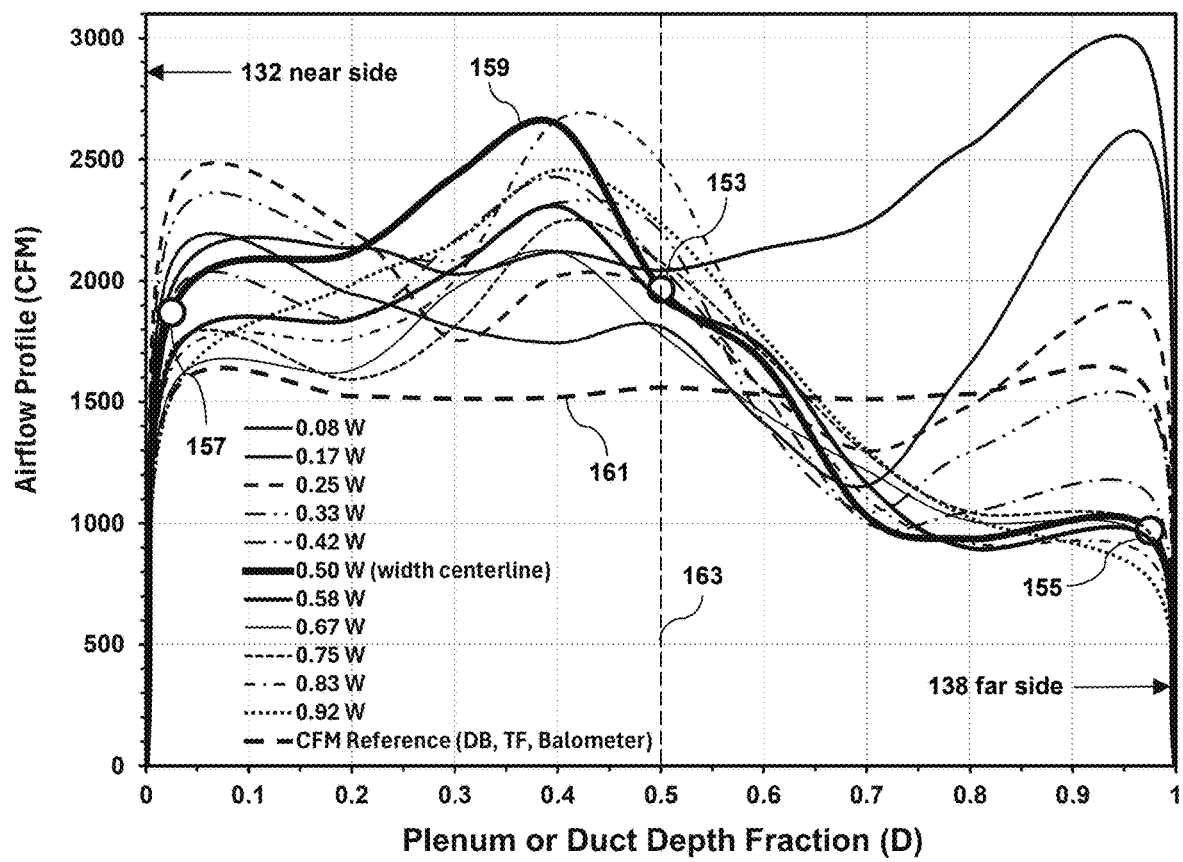
FIG. 6 shows two-dimensional (2D) airflow profiles (in CFM) for eleven sets of hot-wire anemometer measurements traversing a 20-inch deep by 24-inch wide plenum or duct indicating higher values on the near side at 0 to 2 inches depth, the centerline at 7 to 10 inches depth, and the far side at 18 to 20 inches of depth. Also shown is a CFM reference airflow profile for a fan-powered flow hood (Duct Blaster), pressure grid (Trueflow), and a balometer flow capture hood.

FIG. 6 shows a two-dimensional (2D) Airflow profile (in CFM) for eleven sets of hot-wire anemometer measurements traversing a plenum or a duct depth fraction based on a 20-inch deep by 24-inch wide plenum or duct cross sectional area. The airflow measurements are for eleven traverses from 0.08 to 0.92 times the Width (W). In the disclosed embodiment, the higher airflow measurements are on a near side 132 at 0 to 0.1 times D (or 0 to 2 inches depth), a depth centerline 163 at 0.35 to 0.5 times D (or 7 to 10 inches depth), and a far side 138 at 0.9 to 1 times D (or 18 to 20 inches of depth). Also shown is a CFM reference 161 airflow profile based on the average HVAC airflow measured with a fan-powered flow hood (Duct Blaster), a pressure grid (Trueflow), and a balometer flow capture hood. As described hereinabove, the disclosed simple airflow measurement method inserts a hot-wire anemometer probe into an access hole at the width centerline of a supply or return plenum or duct and measures a centerline airflow curve 159 by measuring a first airflow measurement 157 of 1870 CFM at 0 to 0.1 times D (or 0 to 2 inches) from the near side 132 of the plenum or the duct where the hot-wire anemometer probe is inserted (e.g., at the near side location). A second airflow measurement 153 of 1966 CFM is measured at 0.5+/−0.05 times D (or within +/−1 inches) of the depth centerline 163 (e.g., at the depth centerline location). A third airflow measurement 155 of 970 CFM is measured at a depth of 0.9 to 1 times D (or 18 to 20 inches) or 0 to 0.1 times D (or 0 to 2 inches) from the far side 138 of the plenum or the duct (e.g., at the far side location). The average airflow is 1602 CFM based on the three airflow measurements.

A balometer flow capture hood measured 1560 CFM (or 736 Liters Per Second or 736 LPS), a fan-powered flow hood (Duct Blaster or DB) measured 1488 CFM, and a pressure grid (Trueflow or TF) measured 1532 CFM. The first log-T anemometer method measured 1224 CFM which is 20% lower than the 1527 CFM average of the other methods. A second Log-T anemometer method measured 1744 CFM which is 14% greater than the 1527 CFM average of the other methods. The log-T anemometer methods made 99 to 189 measurements and took 30 minutes, compared to less than 5 minutes for the herein disclosed simple airflow measurement method shown in FIG. 1 and FIG. 2. In contrast, the simple airflow measurement method of FIG. 1 only used the first airflow measurement 157, the second airflow measurement 153 and/or the third airflow measurement 155 to calculate the average HVAC system airflow.

As described hereinabove, the disclosed simple airflow measurement method FIG. 2 may comprise making more than 50 percent of measurements on the side of the plenum or duct with the higher airflow, making the remaining airflow measurements between the depth centerline 163 and the opposite side with the lower airflow and averaging the airflow measurements to calculate the average airflow in the plenum or duct. In an embodiment, this method may comprise measuring airflow values on the higher airflow side for a longer time duration than the airflow values on the lower airflow side.

Figure 7:
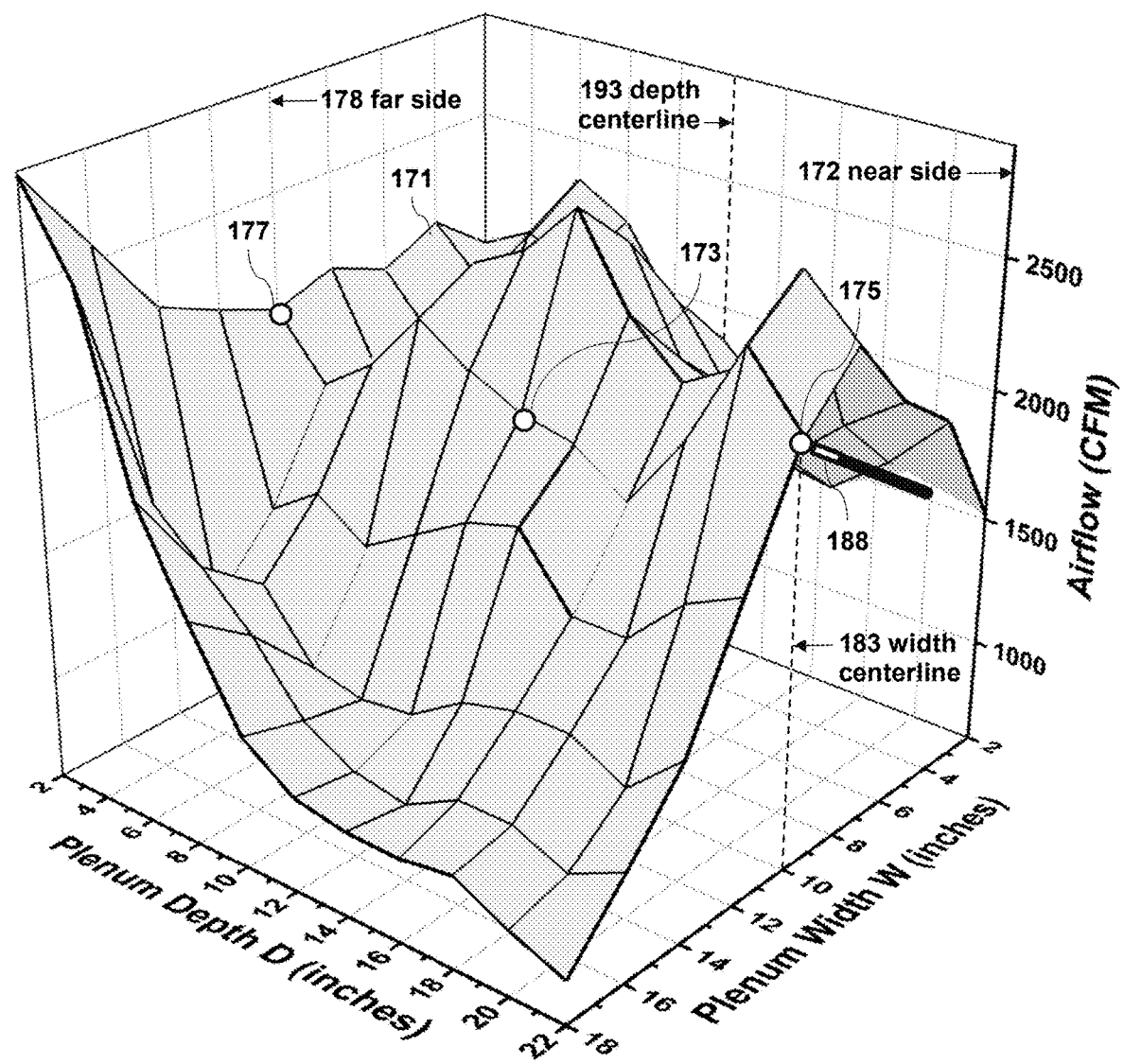
FIG. 7 shows a three-dimensional (3D) airflow surface (in CFM) for eleven sets of hot-wire anemometer measurements for a plenum or a duct that is 20-inches deep by 24-inches wide.

FIG. 7 shows a three-dimensional (3D) airflow surface 171 (in CFM) for the eleven sets of hot-wire anemometer measurements for a plenum or a duct that is 20-inches deep by 24-inches wide. The herein disclosed airflow measurement method inserts a hot-wire anemometer probe 188 into an access hole (not shown) at a width centerline 183 of a supply or return plenum or duct and measures a centerline flowrate at a depth centerline 193 of the airflow surface 171 by measuring a first airflow measurement 175 of 1870 CFM at 0 to 2 inches from the near side 172 of the plenum or the duct where the hot-wire anemometer probe is inserted. A second airflow measurement 173 of 1966 CFM is measured within +/−1 inches of the depth centerline 193. A third airflow measurement 177 of 970 CFM is measured at 0 to 2 inches from the far side 178 of the plenum or the duct. Based on these three airflow measurements, the average HVAC airflow is 1602 CFM which is within 5% of the average airflow of 1527 CFM measured with the other methods.

FIG. 8 shows a prior art schematic diagram of the known log-Tchebycheff method with thirty (30) or more traverse measurement points in a rectangular duct of Width (W) and Depth (D) to insert a hot-wire anemometer to measure HVAC airflow where there are 6 or more 5/16-inch holes drilled in the plenum or duct at six (6) locations based on the Width (W) of the duct. Measurements are made at 30 locations based on the Depth (D) of the duct.

FIG. 9 shows a prior art table of traverse locations for the rectangular duct of FIG. 8 for a known log-Tchebycheff method for less than (<) 30 inches, 30 to 63 inches, and greater than 63 inches of Width (W) of the duct. Measurements are made at 30 to 49 locations based on the Depth (D) of the duct from the near wall. The known log-Tchebycheff method for rectangular ducts drills 6 or more holes and measuring at multiple locations which is tedious, time consuming, and complicated causing user errors.

FIG. 10 shows a prior art schematic diagram of known log-Tchebycheff method with thirty (30) or more traverse measurement points in a circular duct less than 10 inches diameter to insert a hot-wire anemometer to measure HVAC airflow.

FIG. 11 shows a prior art table of traverse locations for the circular duct of FIG. 10 for a known log-Tchebycheff method for less than (<) 10 inches and greater than or equal to (2) 10 inches. The known log-Tchebycheff method for circular ducts drills 3 or more holes and measuring at multiple locations which is tedious, time consuming, and complicated causing user errors.

FIG. 12 shows a prior art schematic diagram of known log-Tchebycheff method with thirty (30) or more traverse measurement points in a circular duct 210 inches diameter to insert a hot-wire anemometer to measure HVAC airflow.

FIG. 13 provides a summary of airflow measurements (in CFM) comparing the relative accuracy of the disclosed airflow measurement method to the relative accuracy of the more complicated log-Tchebycheff (log-T), fan-powered flow hood (Duct Blaster), pressure grid (Trueflow), or balometer flow capture hood methods. The herein disclosed first simple airflow measurement method is 18 to 20% more accurate than the log-T method and takes less than 5 minutes to perform, compared to the other more complicated methods, such as the Duct Blaster, Trueflow, or balometer flow capture hood methods, which may take 30 to 60 minutes to perform.

In an embodiment, the first simple airflow measurement method of FIG. 1 averages measurements using the following equation.

$$CFM_{ave} = \frac{\sum_{i=1}^{n} CFM_i + \sum_{i=1}^{c} CFM_j + \sum_{k=1}^{f} CFM_k}{n+c+f} \quad \text{Eq. 3}$$

Where, $CFM_{ave}$=average airflow measured in Cubic Feet per Minute (CFM) or liters per second (LPS),
n=number of near side airflow measurements of plenum, duct, or box near a single access hole.
c=number of centerline airflow measurements at a centerline of plenum, duct, or box.
f=number of far side airflow measurements at far side of plenum, duct, or box at a far depth from a single access hole.

As such for the first simple airflow method, the sum of the near side measurements $$\left(\sum_{i=1}^{n} CFM_i\right),$$

the sum of the centerline measurements $$\left(\sum_{j=1}^{c} CFM_j\right),$$

and the sum of the far side measurements $$\left(\sum_{k=1}^{f} CFM_k\right),$$

are added together and divided by the total quantity of measurements taken (n+c+f) to calculate the average airflow. In an embodiment, the second simple airflow measurement method of FIG. 2 averages measurements using the following equation.

$$CFM_{ave} = \frac{\sum_{i=1}^{h} CFM_i + \sum_{j=1}^{l} CFM_j}{h+l} \quad \text{Eq. 4}$$

Where, $CFM_{ave}$=average airflow measured in Cubic Feet per Minute (CFM) or other units,
h=number of higher side airflow measurements from centerline of plenum, duct, or box towards higher airflow side.
l=number of lower side airflow measurements from center of plenum, duct, or box towards lower airflow side.

As such, for the second simple airflow method, the sum of the higher airflow side measurements $$\left(\sum_{i=1}^{h} CFM_i\right)$$

and the sum of the lower airflow side measurements $$\left(\sum_{j=1}^{l} CFM_j\right)$$

are added together and divided by the total quantity of measurements taken (h+l) to calculate the average airflow.

In an embodiment, a first simple airflow measurement method comprises measuring a Heating, Ventilating, Air Conditioning (HVAC) system airflow, the HVAC system having an air register and a plenum, a duct, or a box in fluid communication with the air register. The air register may be a return air register or a supply air register and the plenum may be a return air plenum or a supply air plenum. In an embodiment, the HVAC system may comprise more than one return air register or more than one supply air register. The first simple airflow method further comprises drilling a single access hole in a near side of the plenum, the duct, or the box, wherein the box is configured to be reversibly engaged with the air register. The method further comprises inserting a hot-wire anemometer probe into the single access hole, positioning the hot-wire anemometer probe at a near side location disposed between the near side and a depth centerline of the plenum, the duct, or the box and taking a first airflow measurement. In said embodiment, the first simple method further comprises positioning the hot-wire anemometer probe at a depth centerline location disposed on the depth centerline approximately halfway between the near side and a far side of the plenum, the duct, or the box and taking a second airflow measurement. In said embodiment, the first simple method further comprises positioning the hot-wire anemometer probe at a far side location disposed between the depth centerline and the far side of the plenum, the duct, or the box and taking a third airflow measurement. The first simple airflow measurement method may also comprise calculating an average HVAC system airflow based on the first airflow measurement, the second airflow measurement, and the third airflow measurement. An evaporator coil or heat exchanger may be nested within the plenum.

In an embodiment, the first simple airflow measurement method further comprises entering a cross sectional shape and dimensions of the plenum, the duct, or the box from which the measurements are taken into a digital hot-wire anemometer tool. In said embodiment, the first airflow measurement, the second airflow measurement, and the third airflow measurement may be measured as a volumetric airflow rates. The method may further comprise comparing the first airflow measurement to the second airflow measurement and the third airflow measurement and determining whether the near side location, the far side location, or the depth centerline location of the plenum or the duct provides a higher airflow. In an embodiment, the first simple airflow measurement method comprises performing at least one measurement selected from the group consisting of: measuring F far side airflow measurements and N near side airflow measurements wherein the N is greater than the F or measuring airflow for a longer time duration at the near side location than at the far side location, wherein an $N_{time}$ is greater than an $F_{time}$, when the near side location has higher airflow than the far side location; measuring the F far side airflow measurements and the N near side airflow measurements wherein the F is greater than the N or measuring the airflow for the longer time duration at the far side location than at the near side location, wherein the $F_{time}$ is greater than the $N_{time}$, when the far side location has higher airflow than the near side location; measuring the F far side airflow measurements and the N near side airflow measurements wherein the F is equal to the N or measuring the airflow for an equivalent time duration at the far side location and at the near side location, when the airflow at the near side location and the airflow at the far side location are each less than the second airflow measurement; measuring C centerline airflow measurements, N near side airflow measurements and F far side airflow measurements, wherein the C is greater than N and C is greater than F or measuring the airflow for the longer time duration at the depth centerline location than at the near side location or the far side location, wherein a $C_{time}$ is greater than the $N_{time}$ and $C_{time}$ is greater than the $F_{time}$, when the depth centerline location has higher airflow than the near side location and the depth centerline location has higher airflow than the far side location; and calculating the average HVAC system airflow based on a weighted average of the N near side airflow measurements, the C centerline airflow measurements, and the F far side airflow measurements.

In an embodiment, the disclosed simple airflow measurement method comprises calculating an average HVAC system airflow based on a weighted average of the N near side airflow measurements, the C centerline airflow measurements, and the F far side airflow measurements. In said embodiment, the method comprises measuring more than 50% of the airflow measurements on a higher airflow side (e.g., the near side, the centerline, or the far side) and measuring less than 50% of the airflow measurements on a lower airflow side(s) (e.g., the "sides" that do not have the highest airflow) based on a time duration. In said embodiment, the airflow measurements measured on the higher airflow side are measured over a longer time duration than the airflow measurements measured on the lower airflow side(s). In short, more time is spent taking airflow measurements on the higher airflow side than on the lower airflow side in said embodiment, thus resulting in there being more airflow measurements for the higher airflow side than the lower airflow side(s).

In an embodiment, a second simple airflow measurement method for measuring a HVAC system airflow across an evaporator or heat exchanger coil comprises drilling a single hole in a plenum, a duct, or a box wherein the box is configured to be reversibly engaged with a return air register; inserting a hot-wire anemometer probe in the one hole. The second simple airflow measurement method may further comprise measuring a far side airflow, a centerline airflow, and a near side airflow. In an embodiment, the second simple airflow measurement method determines which side of a centerline of the plenum the duct, or the box (e.g., the near side or the far side) provides higher airflow values compared to a centerline airflow value. This method may also comprise measuring more than 50% of the airflow values on the higher airflow side and measuring less than 50% of airflow values on the lower airflow side. Furthermore, this second simple airflow measurement method comprises calculating an average HVAC system airflow based on a sum of the higher side airflow values plus the sum of the lower airflow values divided by a total quantity of measured airflow values.

In an embodiment, the second airflow measurement method comprises entering a cross sectional shape and dimensions of the plenum or the duct into a digital hot-wire anemometer tool. In said embodiment, the far side airflow, the centerline airflow, and the near side airflow are measured as volumetric airflow rates. In an embodiment, measuring the higher side airflow value comprises inserting the hot-wire anemometer probe into the one hole and locating/positioning the hot-wire anemometer probe between the centerline of the plenum or the duct and the far side of the plenum or the duct and taking a far side airflow measurement and further locating/positioning the hot-wire anemometer probe between the centerline of the plenum or the duct and the near side of the plenum or the duct and taking a near side airflow measurement.

In an embodiment, taking a far side airflow measurement at a far side location, a depth centerline airflow measurement at a depth centerline location, and a near side airflow measurement at a near side location comprises positioning the hot-wire anemometer probe between the depth centerline of the plenum, the duct, or the box and the far side of the plenum, the duct, or the box and taking the far side airflow measurement, positioning the hot wire anemometer probe at the depth centerline of the plenum, the duct, or the box and taking a depth centerline airflow measurement, and positioning the hot-wire anemometer probe between the depth centerline of the plenum, the duct, or the box and a near side of the plenum, the duct, or the box, and taking the near side airflow measurement. The second simple airflow measurement method may further comprise comparing the far side airflow measurement to the near side airflow measurement and the centerline airflow measurement and determining a higher side airflow value based on the far side airflow, the centerline airflow, and the near side airflow.

The second simple airflow measurement method may comprise taking more than 50% of the airflow measurements on the higher airflow side and taking less than 50% of the airflow measurements on the lower airflow side based on a time duration, wherein the more than 50% of the airflow measurements on the higher airflow side are measured over a longer time duration than the less than 50% of the airflow measurements on the lower airflow side.

In an embodiment, the disclosed method for measuring an HVAC system airflow across an evaporator or heat exchanger coil comprises drilling a single hole in a near side of a plenum, a duct, or a box, wherein the box is reversibly engaged with a return air register; inserting a hot-wire anemometer probe in the single hole, wherein the single hole is disposed within the plenum, the duct, or the box; taking at least one airflow measurement selected from the group consisting of: positioning the hot-wire anemometer probe at a near side location disposed between a near side and a depth centerline of the plenum, the duct, or the box and taking a near side airflow measurement with the hot-wire anemometer probe, positioning the hot-wire anemometer probe at a centerline location disposed midway between the near side and a far side of the plenum, the duct, or the box and taking a centerline airflow measurement with the hot-wire anemometer probe, and positioning the hot-wire anemometer probe at a far side location disposed between the far side and the depth centerline of the plenum, the duct, or the box and taking a far side airflow measurement with the hot-wire anemometer probe; and calculating an average HVAC system airflow based on the at least one airflow measurement.

In an embodiment, when the average HVAC system airflow ($CFM_a$) is less than a minimum HVAC system airflow (MIN), the average HVAC system airflow is increased by at least one method selected from the group consisting of: repairing crushed or leaking ducts, repairing insulation blocking the airflow, opening registers, increasing duct size (diameter or cross-sectional area to reduce a static pressure), increasing fan speed, and defrosting and cleaning an evaporator coil.

In an embodiment, the airflow measurement method comprises entering a cross sectional shape and dimensions of the plenum or the duct into a digital hot-wire anemometer tool. The first airflow, the second airflow, and the third airflow are measured as a volumetric airflow rate. In an embodiment the box is secured with an adhesive tape or other attachment method to a wall, a ceiling, or a door surrounding a return grill and the box overlaps a return grill to capture the HVAC system airflow through the return grill.

In an embodiment, the airflow measurement method comprises drilling or using a single hole (if the hole is already present) in a near side of a plenum, a duct, or a box, wherein the box is reversibly engaged with/attached to a return air register; inserting a hot-wire anemometer probe in the single hole; positioning the hot-wire anemometer probe at a near side location disposed between a near side and a depth centerline of the plenum, the duct, or the box, and measuring airflow at the near side location with the hot-wire anemometer and positioning the hot-wire anemometer probe at a far side location disposed between a far side and the depth centerline (or centerline) of the plenum, the duct, or the box, and measuring airflow at the far side location with the hot-wire anemometer; and calculating an average HVAC system airflow based on the airflow measurements. Alternatively, the single hole may be located on the far side of the plenum, the duct, or the box.

In an embodiment, the airflow measurement method comprises calculating and reporting a cooling energy efficiency improvement or a heating energy efficiency improvement. The cooling efficiency improvement (or EER* improvement) is calculated based on measurements of an initial average HVAC system airflow and an initial temperature split across the evaporator coil before increasing the average HVAC system airflow, and a final average HVAC system airflow and a final temperature split across the evaporator coil after increasing the average HVAC system airflow. The temperature split across the evaporator coil is based on a return air drybulb temperature minus a supply air drybulb temperature. The heating efficiency improvement is calculated based on the measurements of the initial average HVAC system airflow and an initial temperature rise across the heat exchanger before increasing the average HVAC system airflow, and the final average HVAC system airflow and a final temperature rise across the heat exchanger after increasing the average HVAC system airflow. The temperature rise across the heat exchanger is based on the supply air drybulb temperature minus the return air drybulb temperature.

In an embodiment, the airflow measurement method comprises increasing the average HVAC system airflow when the average HVAC system airflow is less than a minimum HVAC system airflow. The average HVAC system airflow is increased by at least one method selected from the group consisting of: repairing a crushed or a leaking duct, repairing an insulation blocking the airflow, opening a register, increasing a duct size (diameter or cross-sectional area to reduce a static pressure), increasing a fan speed, and defrosting and cleaning an evaporator coil.

In an embodiment, the airflow measurement method comprises reporting an energy efficiency ratio (EER*) improvement. The EER* improvement is calculated based on measurements of an initial average HVAC system airflow and an initial temperature split across the evaporator coil and a final temperature split across the evaporator coil after adding refrigerant to an air conditioning system. The EER* improvement may also be calculated based on measurements of an initial average HVAC system airflow and an initial temperature split across the evaporator coil before increasing the average HVAC system airflow, and a final average HVAC system airflow and a final temperature split across the evaporator coil after increasing the average HVAC system airflow.

While the method has been described by means of applications thereof, numerous modifications and variations could be made thereto by those skilled in the art without departing from the scope of the description set forth in the claims.

The invention claimed is:

1. A method for measuring a Heating, Ventilating, Air Conditioning (HVAC) system airflow, the HVAC system having an air register and a plenum, a duct or a box in fluid communication with the air register, wherein the box is configured to be reversibly engaged with the air register, the method comprising:
   drilling a single access hole in a near side of the plenum, the duct, or the box;
   inserting a hot-wire anemometer probe into the single access hole;
   positioning the hot-wire anemometer probe at a near side location disposed between the near side and a depth centerline of the plenum, the duct, or the box and taking a first airflow measurement while the hot-wire anemometer probe is in the single hole;
   positioning the hot-wire anemometer probe at a depth centerline location disposed on the depth centerline approximately halfway between the near side and afar side of the plenum, the duct, or the box and taking a second airflow measurement while the hot-wire anemometer probe is in the single hole;
   positioning the hot-wire anemometer probe at a far side location disposed between the depth centerline and the far side of the plenum, the duct, or the box and taking a third airflow measurement while the hot-wire anemometer probe is in the single hole; and
   calculating an average HVAC system airflow based on the first airflow measurement, the second airflow measurement, and the third airflow measurement.

2. The method of claim 1, further comprising entering a cross sectional shape and dimensions of the plenum, the duct, or the box into a digital hot-wire anemometer tool, wherein the digital hot-wire anemometer tool is in electrical communication with the hot-wire anemometer probe.

3. The method of claim 1, further comprising increasing the average HVAC system airflow through the HVAC system when the average HVAC system airflow is less than a minimum HVAC system airflow,
   wherein the average HVAC system airflow is increased by at least one of repairing crushed or leaking ducts, repairing insulation blocking the airflow, opening registers, increasing duct size, increasing fan speed, defrosting and cleaning an evaporator coil, gr cleaning a heat exchanger,
   wherein the evaporator coil and the heat exchanger are disposed within the HVAC system and configured to change a temperature of the average HVAC system airflow.

4. The method of claim 3, further comprising reporting at least one of:
   a cooling efficiency improvement, wherein the cooling efficiency improvement is calculated based on measurements of an initial average HVAC system airflow and an initial temperature split across the evaporator coil before increasing the average HVAC system airflow and a final average HVAC system airflow and a final temperature split across the evaporator coil after increasing the average HVAC system airflow, wherein temperature split across the evaporator coil is based on a return air drybulb temperature minus a supply air drybulb temperature; or
   a heating efficiency improvement, wherein the heating efficiency improvement is calculated based on the measurements of the initial average HVAC system airflow and an initial temperature rise across the heat exchanger before increasing the average HVAC system airflow and the final average HVAC system airflow and a final temperature rise across the heat exchanger after increasing the average HVAC system airflow, wherein temperature rise across the heat exchanger is based on the supply air drybulb temperature minus the return air drybulb temperature.

5. The method of claim 1, further comprising comparing the first airflow measurement to the second airflow measurement and the third airflow measurement and determining whether the near side location, the far side location, or the depth centerline location of the plenum, the duct, or the box provides a higher airflow and performing at least one of:
   measuring F far side airflow measurements and N near side airflow measurements, wherein the N is greater than the F, or measuring airflow for a longer duration at the near side location than at the far side location, wherein an $N_{time}$ is greater than an $F_{time}$, when the near side location has the higher airflow than the far side location,
   measuring the F far side airflow measurements and the N near side airflow measurements, wherein the F is greater than the N or measuring the airflow for the longer duration at the far side location than at the near side location, wherein the $F_{time}$ is greater than the $N_{time}$, when the far side location has the higher airflow than the near side location,
   measuring the F far side airflow measurements and the N near side airflow measurements, wherein the F is equal to the N or measuring the airflow for an equivalent duration at the far side location and the near side location, when the airflow at the near side location and the airflow at the far side location are less than the airflow at the depth centerline location,
   measuring C depth centerline airflow measurements, the N near side airflow measurements and the F far side airflow measurements, wherein the C is greater than the N and the C is greater than the F, or measuring the airflow for the longer duration at the depth centerline location than at the near side location or at the far side location, wherein a $C_{time}$ is greater than the $N_{time}$ and the $C_{time}$ is greater than the $F_{time}$, when the depth centerline location has the higher airflow than the near side location and the depth centerline location has the higher airflow than the far side location, or
   calculating the average HVAC system airflow based on a weighted average of the N near side airflow measurements, the C centerline airflow measurements, and the F far side airflow measurements.

6. The method of claim 1, further comprising measuring N airflow measurements at the near side location, C airflow measurements at the depth centerline location, and F airflow measurements at the far side location, wherein the airflow measurements are measured on a higher airflow side over a longer time duration than the airflow measurements measured on a lower airflow side.

7. The method of claim 1 further comprising reporting an energy efficiency ratio (EER*) improvement, wherein the energy efficiency ratio improvement is calculated based on measurements of an initial average HVAC system airflow and an initial temperature split ($TS_i$) across the evaporator coil and a final temperature split ($TS_f$) across the evaporator coil after adding refrigerant to an air conditioning system of the HVAC system, wherein temperature split across the evaporator coil is based on a return air drybulb temperature minus a supply air drybulb temperature.

8. The method of claim 1, wherein the box is secured to a wall, a ceiling, or a door surrounding the air register of the HVAC system, such that the box overlaps with the air register to capture HVAC system airflow through the air register.

9. A method for measuring a Heating, Ventilating, Air Conditioning (HVAC) system airflow across an evaporator or heat exchanger coil, the HVAC system having an air register and a plenum, a duct or a box in fluid communication with the air register, wherein the box is configured to be reversibly engaged with the air register, the method comprising:
    drilling a single hole in the plenum, the duct, or the box;
    inserting a hot-wire anemometer probe in the single hole;
    taking a far side airflow measurement at a far side location, a depth centerline airflow measurement at a depth centerline location, and a near side airflow measurement at a near side location while the hot-wire anemometer probe is in the single hole;
    determining which side of a depth centerline of the plenum, the duct, or the box provides a higher airflow;
    performing additional airflow measurements while the hot-wire anemometer probe is in the single hole, wherein more than 50% of the additional airflow measurements are measured on the higher airflow side and less than 50% of the additional airflow measurements are measured on a lower airflow side; and
    calculating an average HVAC system airflow based on a sum of the additional airflow measurements divided by a total quantity of the additional airflow measurements.

10. The method of claim 9, further comprising entering a cross sectional shape and dimensions of the plenum, the duct, or the box into a digital hot-wire anemometer tool, wherein the digital hot-wire anemometer tool is in electrical communication with the hot-wire anemometer probe.

11. The method of claim 9, further comprising increasing the average HVAC system airflow when the average HVAC system airflow is less than a minimum HVAC system airflow, wherein the average HVAC system airflow is increased by at least one of repairing a crushed or a leaking duct, repairing an insulation blocking the airflow, opening at least one air register, increasing a duct size increasing a fan speed, or defrosting and cleaning an evaporator coil.

12. The method of claim 11 further comprising reporting at least one of:
    a cooling efficiency improvement, wherein the cooling efficiency improvement is calculated based on measurements of an initial average HVAC system airflow and an initial temperature split across the evaporator coil before increasing the average HVAC system airflow, and a final average HVAC system airflow and a final temperature split across the evaporator coil after increasing the average HVAC system airflow, wherein temperature split across the evaporator coil is based on a return air drybulb temperature minus a supply air drybulb temperature, or
    a heating efficiency improvement, wherein the heating efficiency improvement is calculated based on the measurements of the initial average HVAC system airflow and an initial temperature rise across a heat exchanger before increasing the average HVAC system airflow, and the final average HVAC system airflow and a final temperature rise across the heat exchanger after increasing the average HVAC system airflow, wherein temperature rise across the heat exchanger is based on the supply air drybulb temperature minus the return air drybulb temperature.

13. The method of claim 9, wherein taking a far side airflow measurement at a far side location, a depth centerline airflow measurement at a depth centerline location, and a near side airflow measurement at a near side location comprises positioning the hot-wire anemometer probe between the depth centerline of the plenum, the duct, or the box and the far side of the plenum, the duct, or the box and taking the far side airflow measurement, positioning the hot-wire anemometer probe at the depth centerline of the plenum, the duct, or the box and taking a depth centerline airflow measurement, and positioning the hot-wire anemometer probe between the depth centerline of the plenum, the duct, or the box and a near side of the plenum, the duct, or the box, and taking the near side airflow measurement.

14. The method of claim 9, wherein performing the additional airflow measurements is based on durations, wherein airflow measurements on the higher airflow side are measured over a longer duration than airflow measurements on the lower airflow side.

15. The method of claim 7, wherein the single hole is located on the far side location of the plenum, the duct, or the box.

* * * * *